Feb. 11, 1969

R. GOLDSTEIN 3,427,521

GARAGE DOOR RELAY CONTROL CIRCUIT

Filed Dec. 29, 1965

INVENTOR
RICHARD GOLDSTEIN by: Wallenstein, Spangenberg, Hattis
& Strampel
ATTYS.

Feb. 11, 1969  R. GOLDSTEIN  3,427,521
GARAGE DOOR RELAY CONTROL CIRCUIT
Filed Dec. 29, 1965  Sheet 2 of 4
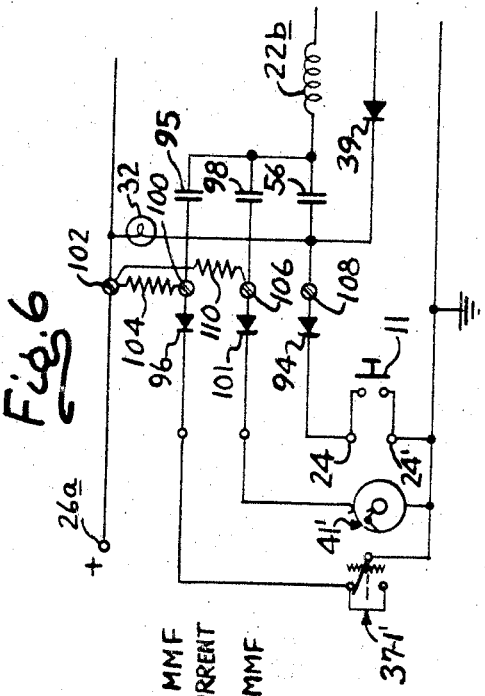
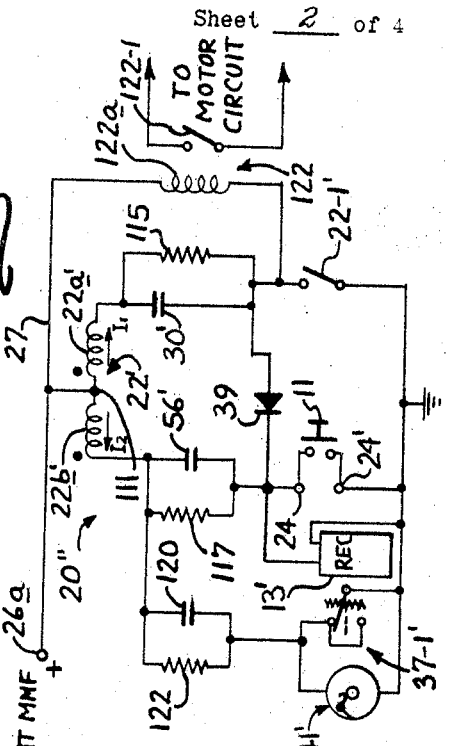
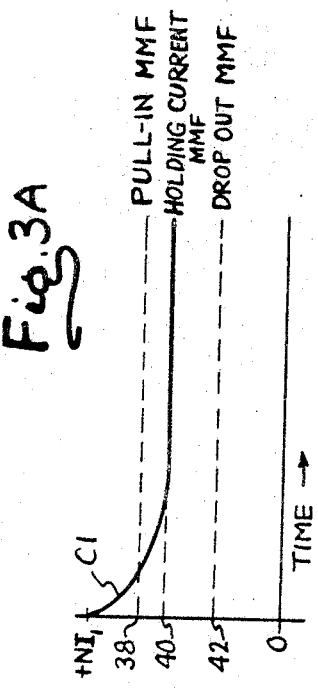
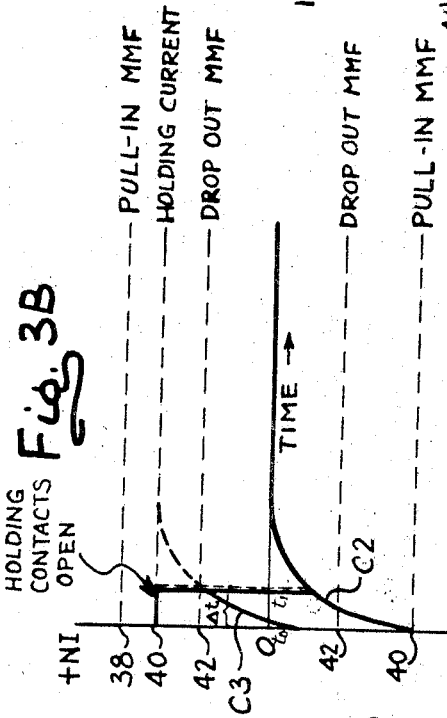
INVENTOR
RICHARD GOLDSTEIN
by: Wallenstein, Spangenberg,
Hattis & Strampel
ATTYS.

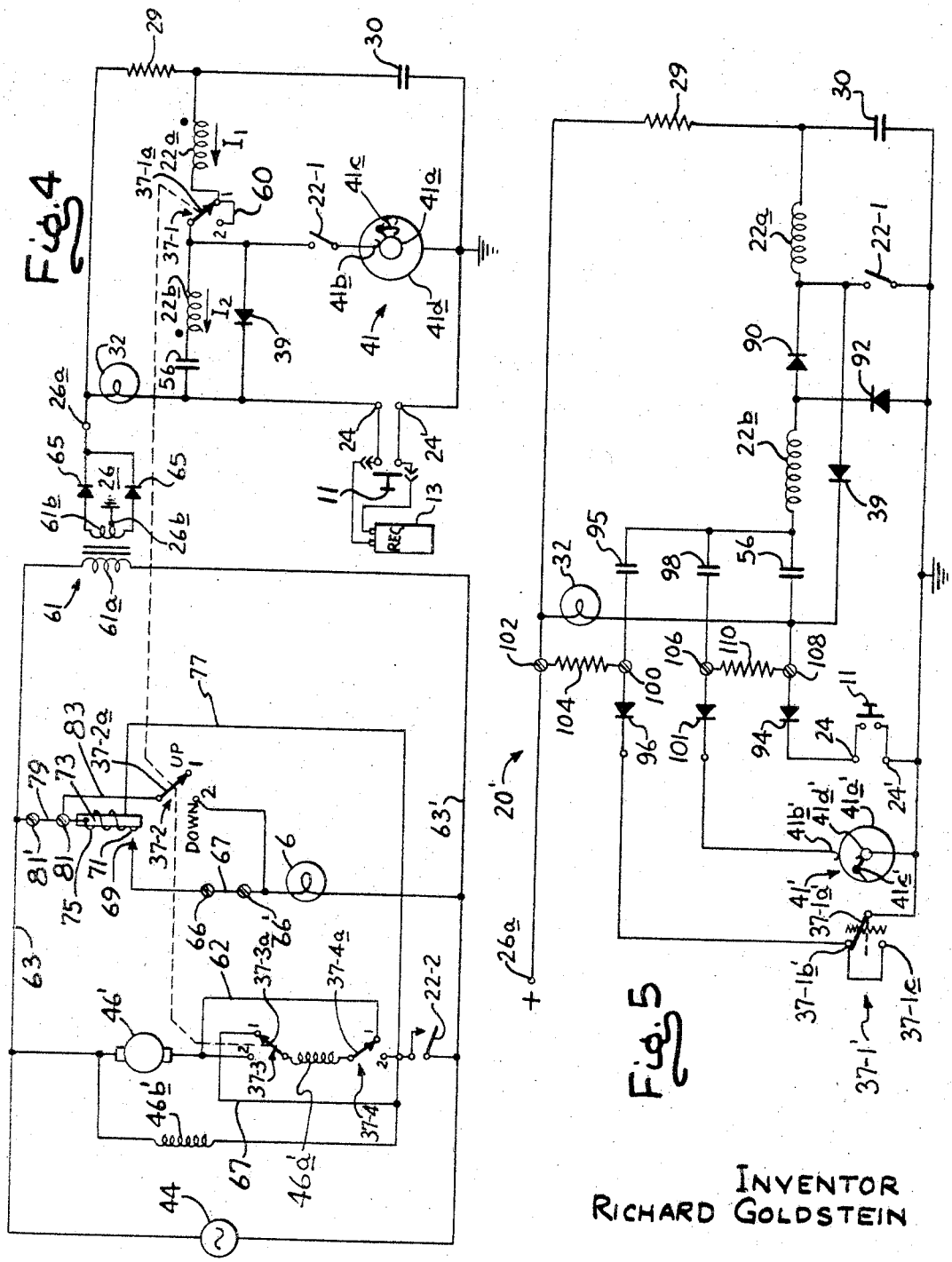

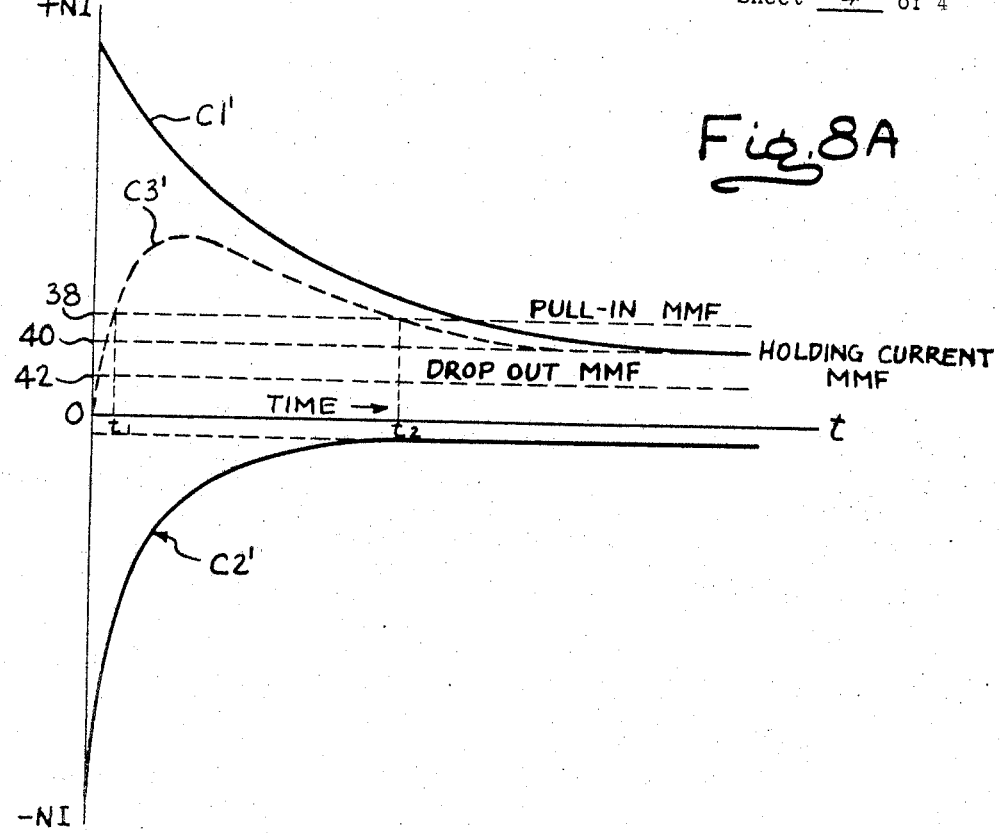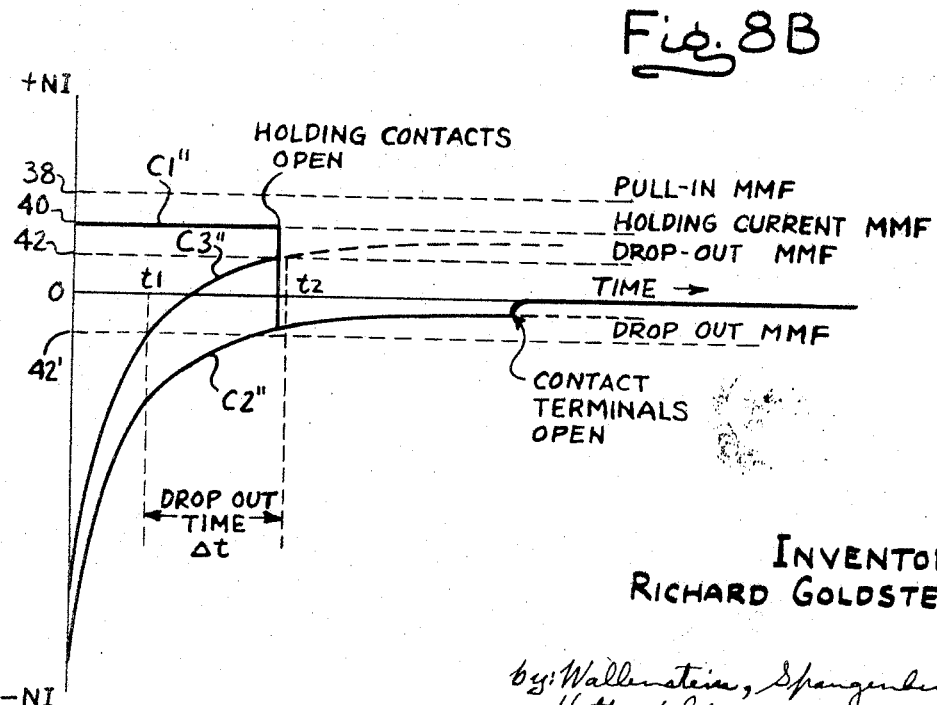

United States Patent Office 3,427,521
Patented Feb. 11, 1969

3,427,521
GARAGE DOOR RELAY CONTROL CIRCUIT
Richard Goldstein, Deerfield, Ill., assignor to Perma-Power Company, Chicago, Ill., a corporation of Illinois
Filed Dec. 29, 1965, Ser. No. 517,360
U.S. Cl. 318—266
Int. Cl. H02p 1/22
28 Claims

ABSTRACT OF THE DISCLOSURE

A garage door operator circuit for controlling motor means which move the garage door from one extreme position to the other each time it is energized. The operator circuit including a relay having first and second winding sections, the flow of a first current of a given magnitude and direction in said first winding section producing a relay energizing magnetomotive force which can be opposed by the magnetomotive force provided by the flow of a second current of a given magnitude and direction in said second winding section which de-energizes the relay. A first circuit including a pair of controls for the first winding section through which flows a current in said first mentioned direction and of at least said first mentioned magnitude when the control terminals are first momentarily short circuited, and a second circuit including a second winding section through which flows a current in said second mentioned given direction and of a magnitude which produces said opposing magnetomotive force which de-energizes said relay when said control terminals are subsequently momentarily short circuited while the relay contact means are in a motor energizing position.

---

This invention relates to garage door relay control circuits for starting and stopping the motors which operate the garage doors, particularly motors as used in radio controlled garage door operators.

Modern residential garage door operators are nearly always equipped with a radio receiver for starting and stopping the door in response to transmitted pulsations generated by a transmitter in the owner's automobile. The radio control, for reasons of economy, convenience of use and reliability of operation, is a single channel communications system analogous to a single pair of wires in a wire communications system. The outputs of the receiver generally provide a momentary circuit closing or ground signal across the output terminals of the receiver when the garage door opening or closing operation is desired. Consequently, it is universal practice to provide the starting and stopping functions by sequential action of the relay motor controller in the door operator mechanism. This sequential control thus requires only a pair of wires running to one or more manually operable wall mounted push button switches inside the garage or home which provide a momentary circuit closing or ground signal when a garage door opening, closing or stopping operation is desired. These push button switches are typically wired using low voltage door bell type circuits for economy and ease of installation.

A large variety of sequential or stepping type relays are available for controlling the garage door operator motor. The earliest versions of these relays use a ratchet and pawl mechanism. Each impulse indexes a shaft to provide a fixed amount of rotation. Cams attached to the shaft operate contacts that open and close with alternate impulses. Other versions employ rocker arm arrangements that operate in toggle fashion to provide the alternate action. One of the most popular types uses a mechanism that latches on the first impulse and unlatches with the second impulse. These relays are commonly known as sequence, ratchet, mechanically held, or single coil latching relays.

The use of mechanical sequence relays like those described above is universal in door operators being manufactured today. These relays are generally more expensive than the general purpose types, often costing two or three times as much. Furthermore they are far less reliable than general purpose relays and as a result have always accounted for a large part of the failures and service costs in residential garage door operators. The relay circuit to be described overcomes many of the disadvantages of the mechanically sequenced relay. More particularly, the advantages of the invention includes the fact that conventional high reliability relays are employed, so the reliability of the system is far greater than any comparably priced mechanical sequence relay. Also, although a single input for start and stop is provided, auxiliary inputs are possible for stopping the motor. Such inputs are desirable for limit and safety switches. These switches should be arranged for reasons of safety so they will only stop the motor. This prevents accidental starting during service or adjustment of the mechanism or door. Heretofore, the use of mechanical or latching sequencing relays created problems and complexities in incorporating limit and safety switch control over the relays. Furthermore, it is sometimes desirable that the safety and limit switches be given priority over the push button and radio control, so that the limits will not be overrun nor the safety defeated by a failure in the radio control, a short circuit in the push button wiring or someone deliberately holding a button down. Circuits to be described provide for these features with no added cost.

Another advantage of the invention is that it allows for considerable reduction in the cost of the receiver portion of the radio control. The savings result from the fact that many of the components used in this new relay system are already required as part of the radio control. These parts include a low voltage DC power supply for the relay control circuits. By properly designing the relay control circuit a voltage present across the normally open terminals of the push button wall switch referred to can be used to energize the radio receiver during standby operation.

The invention includes in the most advantageous form a relay control circuit which can best be placed in the general category of circuits known as toggle or flip-flop circuits. This class of circuits is characterized by the ability to change state from "on" to "off" and vice versa upon receiving pulses at its input terminals, such pulses all being of the same polarity. Toggle flip-flop circuits have been developed for various applications which employ a pair of vacuum tubes or transistors acting as a "divide by two" circuit. In addition to the usual elements associated with the coupling and load circuits employed in these circuits, for an application like a garage door operator, these toggle flip-flop circuits would require the use of steering circuits and some means of insuring that the flip-flop circuits would be in a reference state following the application of power to prevent the garage door from opening when power is initially switched on. A further disadvantage of these circuits in a garage door application is their lack of immunity to noise impulses appearing on the supply mains. Special means must be provided to protect against false tripping from this cause. Finally, this application would require a "one-shot" circuit like a Schmitt trigger circuit to precede it, so that the operation from a push button of the quality commonly employed would give reliable triggering. All of the above requirements preclude the use of conventional flip-flop circuits to replace the mechanical sequence relay in garage door operator applications.

In the present invention, the above disadvantages of conventional circuitry have been eliminated and the cost reduced by a unique application of conventional non-latching type electrical relays which lock-in by electrical rather than mechanical means.

In the preferred form of the present invention, as is usually the case in garage door operator circuits, the primary control over the circuit is by the momentary short circuiting of a pair of main control terminals, one of which is continuously grounded and across which terminals the aforementioned wall push button switch and the receiver output are connected. The relay is preferably one having separate winding sections in which respective currents can separately flow to produce opposing magnetomotive forces. The relay will be in an energized condition where the garage door motor will be energized when the resultant magnetomotive force produced by the currents flowing in the winding sections is above a given pull-in level. In the most preferred circuit to be described, during the energization of the relay current flows in only one of the winding sections. In another less preferred form of circuit to be described, opposing currents flow in both winding sections during energization of the relay but the magnetomotive force produced by the current flowing in one of the sections, momentarily at least, exceeds that produced by the current produced in the other winding section so that the resultant magnetomotive force exceeds the aforesaid pull-in level. Holding contacts then operate to keep a holding current flowing in the former winding section which produces a magnetomotive force which is above a drop-out level (which is lower than the pull-in level). The initial relay energizing current is most advantageously a capacitor produced transient current. Both of the circuits referred to include a rectifier and a first capacitor forming a relay energizing section connected with one of the winding sections (referred to as a first winding section) and the normally ungrounded control terminal and an ungrounded terminal of a source of direct current voltage, the other terminal of which is grounded.

When the control terminals are short circuited by momentary closure of a wall mounted push button switch or the transmission of a garage door operating radio signal from the user's automobile, the first capacitor charges or discharges to produce a transient current flow in the first winding section of the relay which produces a resultant relay energizing magnetomotive force at or above the aforesaid pull-in level. An opposing transient current may or may not flow in the other or second winding section, but the current flow in the first winding section produces a resultant relay energizing magnetomotive force. The relay has a set of contacts in circuit with the first winding section and the terminals of the source of direct current voltage which contacts operate upon energization of the relay to maintain a holding current flow in the first winding section after removal of the short circuit across the control terminals. The same or other contacts of the relay effect energization of the garage door motor during energization of the relay.

A relay de-energizing circuit is formed by a second capacitor connected with the ungrounded control terminal, second winding section of the relay and the ungrounded terminal of the source of voltage. The aforementioned rectifier renders the relay de-energizing circuit operative by becoming non-conductive after the aforesaid operation of the holding contacts. The second capacitor produces a transient current flow through the second winding section of the relay when the control terminals are short circuited a second time which transient current flow produces a magnetomotive force in the second winding section which opposes the magnetomotive force generated by the flow of holding current in the first winding section, to reduce the resultant magnetomotive force below the aforesaid drop-out level for a sufficient period to allow the armature of the relay to move from the position representing the energized state of the relay where the relay contacts effect de-energization of the garage door motor and interrupt the flow of holding current.

In a manner to be described, auxiliary control circuits are provided which includes safety and limit switches which operate to de-energize the relay respectively when the movement of the garage door is arrested for any reason and when the garage door reaches a fully closed or open position. In one form of the invention, the limit and safety switches are normally closed switches in the path of flow of holding current in the first winding section of the relay, the limit and safety switches opening to interrupt the flow of holding current to de-energize the relay when the movement of the garage door is arrested for any reason or where the garage door reaches a fully open or closed position. In another form of the invention, the limit and/or safety switches are positioned in a separate circuit which effects generation of capacitor generated transient current in the second winding section, in a manner analogous to the generation of transient current by said second capacitor upon a short circuiting of said control terminals.

Means are provided for preparing the garage door to operate in the opposite direction each time the garage door is de-energized or when the garage door reaches a fully open or closed position.

The above and other advantages and features of the present invention will become apparent upon making reference to the specification to follow, the claims and the drawings wherein:

Figure 1:
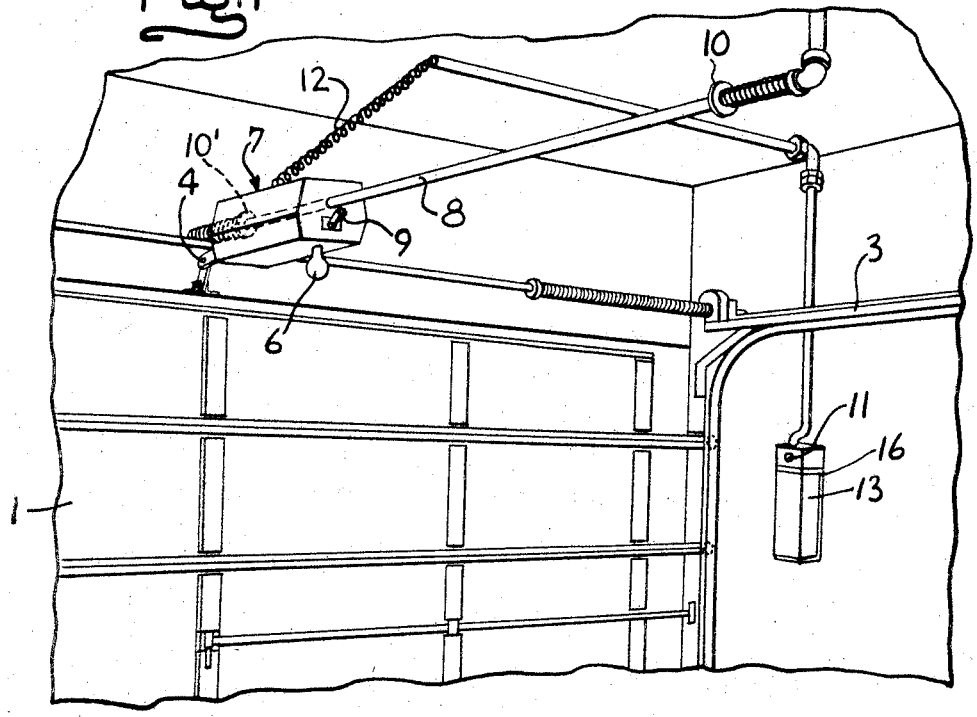
FIG. 1 shows the inside of a garage provided with the various components which make up a radio controlled garage door operating system.
Figure 2:
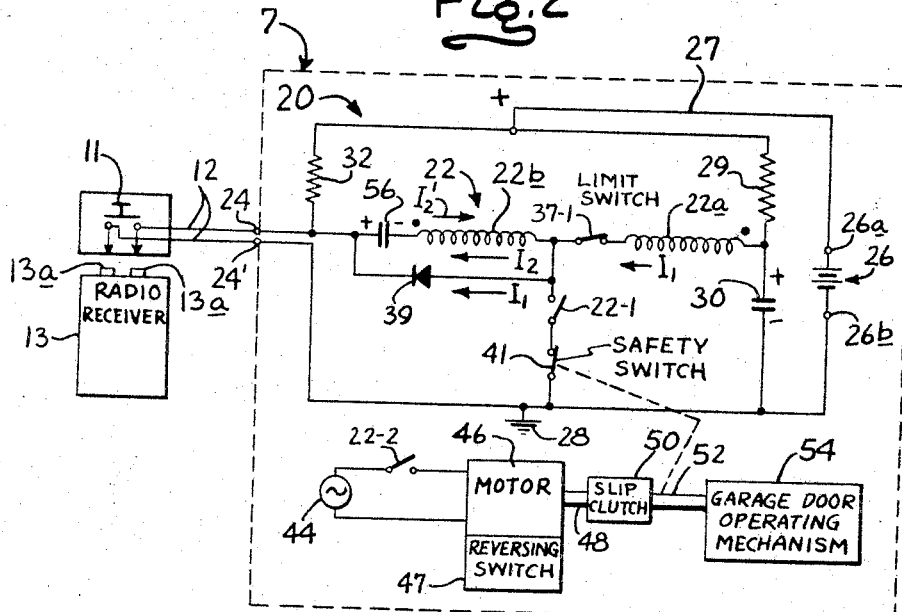
FIG. 2 is a diagram showing the circuitry of an exemplary garage door control relay circuit of the present invention.

FIGS. 3A and 3B respectively show waveforms representing the variation in magnetomotive forces in the different winding sections of the relay circuit shown in FIG. 2 in the relay energizing and relay de-energizing modes of operation of the circuit;

FIG. 4 shows the relay control circuit of FIG. 1 in conjunction with a garage door motor control circuit controlled thereby;

FIG. 5 represents a modified form of the relay control circuit of FIG. 2 where the safety switch can be selectively connected to have priority over operation of the manual push button switch or to be overridden thereby, the particular circuit arrangement shown giving the latter mode of operation;

FIG. 6 shows the circuit of FIG. 5 arranged so that the safety switch has priority over operation of the manual push button switch;

FIG. 7 shows a substantially different form of relay control circuit which represents a less preferred form of the invention; and FIGS. 8A and 8B respectively show waveforms respectively representing the variation in magnetomotive force in the different winding sections of the relay circuit shown in FIG. 7 in the relay energizing and relay de-energizing modes of operation of the circuit.

GENERAL DESCRIPTION (FIG. 1)

FIG. 1 shows, in part, a typical radio controlled garage door operator system installed in a garage having a garage door 1 which rides on side tracks 3, only one of which is shown. The means for closing and opening the garage door include a carriage arm assembly 4 which connects to the garage door at one end and to the housing 7 at the other end. The housing 7 is movably supported on a guide rod 8. The housing 7 includes a garage door drive motor (not shown) which, when energized, will cause a drive wheel to functionally ride along the guide rod 8, and thus cause the entire housing 7 to move along the guide rod 8. As the housing 7 moves on the guide rod 8, the carriage arm 4 attached thereto will move the garage door 1 along with it. (The manner in which the housing 7 is caused to move along the support rod 8 by energization of the drive motor is well known in the art and will not be described in this patent application. It is also apparent that other arrangements may be used for imparting movement to the garage door 1 in response to energization of the garage door drive motor. Such an arrangement, for example, is disclosed in part in application Ser. No. 495,563, filed Oct. 13, 1965.) When the housing 7 reaches one extreme position, a limit switch operating arm 9 will engage a stationary flange 10, and, in a manner to be described, will stop the motor, the housing 7 and garage door 1 coupled thereto. In the other extreme position of the housing 7, a limit switch operating arm (not shown) like the arm 9 will engage a flange 10' similar to flange 10 to operate a limit switch causing de-energization of the motor.

The housing 7 includes, in addition to the motor, various other equipment such as an operator circuit (not shown in FIG. 1) which controls the operation of the garage door drive motor, and also, if desired, an electric lamp 6 extending from the housing 7. The lamp 6 preferably is automatically turned on when the garage door is in its fully open position and remains lighted several minutes after the garage door returns to its fully closed position.

The garage door drive motor may be of a type where the motor reverses in direction each time it is re-energized. In such case, the motor reverses automatically by a centrifugal switch which sets up a starting winding thereof in opposite polarity with respect to a running winding thereof each time the motor comes to rest. Alternatively, a special toggle switch arrangement to be described operated by the movement of the garage door into a fully open or fully closed position can prepare the drive motor for operation in a reverse direction.

The garage door operator unit is actuated from the vicinity of the garage by manual push button switch 11 shown mounted on the wall of the garage. A pair of wires 12 extends in a conduit from the switch 11 to the door operator unit within the housing 7. When the user desires to open the garage door, he presses the manual push button switch 11, whereupon the aforementioned drive motor in the housing 7 becomes energized and effects movement of the housing 7 to the right which raises the garage door. When the door reaches the end of its path of travel, the aforementioned limit switch shuts off the motor. When the manual switch 11 is depressed again, the garage door drive motor becomes energized again and moves the housing 7 to the left which lowers the garage door. The aforementioned limit switch automatically terminates the operation of the motor when the garage door is completely closed. Depression of the push button switch 11 during movement of the garage door between its extreme position will stop the garage door drive motor. Also, a safety switch (not shown) is provided which will stop the garage door drive motor if a force is applied against the door tending to stop its movement. (Such safety switches are well known and usually include a slip clutch which permits slippage between the drive motor shaft and an output shaft coupled to the means which directly moves the housing 7 or other garage door moving element. A centrifugally operated switch driven by the output shaft will assume a given position when the output shaft stops or rotates below a given speed and will assume an opposite position when the garage door is moving at the normal speed.)

It is common to incorporate remote radio control from the user's car, in addition to the manual control as described, over the operation of the garage door. To this end, a transmitter (not shown in FIG. 1) is installed in the user's automobile. The transmitter usually includes a push button control which when depressed will cause the transmitter to generate an amplitude modulated signal. The modulation frequency of the radio signal is varied within a given location encompassing the range of the transmitter involved, so that the signal from a given transmitter will only operate the desired garage door.

The radio signal is received by a radio receiver which is sometimes incorporated within the housing 7. In such case, when trouble develops in the receiver, the inaccessibility thereof usually required a service man to disconnect the radio receiver and bring the same to a radio servicing shop. The preferred relay control circuit of the present invention allows the radio receiver to be energized solely from the voltage appearing across the terminals of the push button switch 11. A special unique receiver circuit is required for this purpose. Such a receiver is disclosed in said copending application Ser. No. 495,563. In such case, it is very advantageous to mount the radio receiver identified by reference numeral 13 in FIG. 1, on a mounting frame 16 including the manual push button switch 11. The connections between the radio receiver and the mounting frame may be a simple removable type plug-in or similar connections. Thus, when the radio receiver 13 is mounted in place on the frame 16, the radio receiver is automatically connected to the terminals of the switch 11. If the radio receiver needs servicing, the user merely pulls the exposed receiver from the frame 16, and takes the same to a service shop, thereby saving much time and expense for all concerned.

RELAY CONTROL CIRCUIT OF FIG. 2

The relay control circuit of FIG. 2, identified generally by reference numeral 20, has the important advantage that it is a very reliable and economical circuit needing only a single conventional direct current relay 22. Also, the main control terminals 24–24' of the circuit 20 provide a direct current voltage which is capable of providing standby power for the radio receiver 13.

The relay 22 has a pair of winding sections 22a and 22b in which respective currents I1 and I2 can separately flow to produce opposing magnetomotive forces. The magnetomotive force generated by the flow of current in each winding section is a function of the polarity of the ampere turns involved, that is the direction of current flow in the winding section, the magnitude of the current and the number of turns of wire making up the winding section. Although the number of windings in each section can vary, for purposes of simplicity it will be assumed that the winding sections 22a and 22b have the same number of turns. The armature of the relay controls one or more sets of contacts. In the circuit shown in FIG. 2, the relay has a pair of normally-open holding contacts 22–1 and a pair of normally-open motor control contacts 22–2. When the resultant magnetomotive force produced by the current flow in the winding sections 22a and 22b initially exceeds a given level, referred to as the pull-in level, the relay is energized and the armature of the relay is pulled into a position where the contacts 22–1 and 22–2 will close. The relay will remain energized to maintain the contacts 22–1 and 22–2 closed until the resultant magnetomotive force drops to or below a level referred to as the drop-out holding level.

The source of voltage for energizing the relay 22 is a source of direct current voltage 26 having terminals 26a and 26b across which the direct current output voltage thereof appears. One of these terminals 26b, which will be designated as a negative voltage terminal for convenience, is connected to a common reference point or ground 28, and the other terminal 26a, which is the positive terminal, is coupled through a conductor 27 and a resistor 29 to one of the plates of a capacitor 30 whose opposite plate is grounded. The capacitor 30 will, therefore, initially charge up to the magnitude of the output of the source of voltage 26.

The aforementioned control terminals 24–24' are connected by the aforesaid wires 12—12 across the terminals of the push button wall switch 11 which is assumed to be normally-open, so that the control terminals 24—24' are normally-open circuited. The control terminals 24—24' are connected to the output terminals 13a—13a of the radio receiver 13, so that the terminals 24–24' are momentarily short circuited by either depression of the switch 11 or by the radio receiver 13 when it receives a radio signal. The radio receiver 13 is unique in that the terminals 13a—13a serve as output terminals and power-receiving terminals for the receiver. As above indicated, such a radio receiver is disclosed in said application Ser. No. 495,563.

One of the control terminals 24′ is preferably connected to ground 28 and the other terminal 24 is connected through a resistor 32 to the conductor 27 leading to the positive terminal 26a. The resistance of resistor 32 is preferably made small (e.g. one tenth or more) relative to the standby impedance across the power receiving terminals 13a—13a of the radio receiver 13 so that practically all of the voltage of the source of direct current voltage will normally appear across the control terminals 24–24′ when the same are connected to the power receiving terminals of the radio receiver and practically all of the power normally delivered by the source of voltage will be supplied to the radio receiver rather than being absorbed by the resistor 32. (It should be understood that in accordance with a broad aspect of the invention, the power for operating the receiver need not be supplied from across the control terminals 24–24′.)

One of the ends of the relay winding section 22a is connected to the juncture of the capacitor 30 and the resistor 29, and the other end of the winding section 22a is connected through normally closed limit switch contacts 37–1 to the anode of a rectifier 39. The cathode of the rectifier 39 is connected to the ungrounded control terminal 24. (It is understood that if the polarity of the connections to the source of direct current voltage 26 will be reversed, the connections of the rectifier 39 would also be reversed.)

When the control terminals 24–24′ are momentarily short circuited, capacitor 30 discharges through a circuit including the winding section 22a and rectifier 39. This produces a transient current which produces a magnetomotive force variation shown by curve C1 in FIG. 3A. This magnetomotive force starts from a point 38 which is above the pull-in magnetomotive force level and terminates at a level 40 established by the flow of holding current through the winding section 22a due to closure of holding contacts 22–1. This level 40 is above the drop-out level 42. The holding contacts 22–1 are connected between the juncture of the rectifier 39 and limit switch 37 and a normally closed safety switch 41 connected to ground to establish a path for the flow of holding current through the winding section 22a, the path including resistor 29, limit switch contacts 37–1, holding contacts 22–1 and safety switch 41, which path is independent of the rectifier 39 and the control terminals 24–24′. The closure of holding contacts 22–1 places ground on the anode of the rectifier 39, and so when the control terminals 24–24′ become open circuited the positive voltage is applied to the cathode of the rectifier 39 through the resistor 32 which causes the rectifier to become blocked. This activates a circuit comprising winding section 22b and a capacitor 56 connected in series across rectifier 39, the capacitor 56 charging to produce a momentary current I2′ flowing in the opposite direction to current I2 shown in FIG. 2. The current I2′ produces a magnetomotive force which reinforces that produced by the flow of holding current in winding section 22a.

The energization of relay 22 closes motor control contacts 22–2 coupled between a source of voltage, shown as an alternating current voltage source 44, and the garage door drive motor 46. It is assumed that the motor 46 is of a type which includes within the same, well known centrifugal switch mechanism 47 which automatically changes the connections to the field windings thereof to reverse the direction of the drive motor each time the motor stops. The drive motor 46 has a drive shaft 48 connected to a slip clutch 50 having an output shaft 52 which drives the garage door operating mechanism 54 which imparts movement to the housing 7 in the embodiment shown in FIG. 1.

If the control terminals 24–24′ are momentarily short circuited for a second time by closure of the switch 11 or the reception of a radio signal of proper frequency by the receiver 13 before opening of the limit switch contacts 37–1 or the limit switch 41, capacitor 56 discharges through a path including the control terminals 24–24′, safety switch 41, relay holding contacts 22–1 and winding section 22b to produce the aforesaid transient current I2. The transient current I2 produces a magnetomotive force illustrated by waveform C2 in FIG. 3B. The magnetomotive force produced by the holding current in the winding section 22a is opposed by the magnetomotive force C2 which produces a resultant magnetomotive force represented by curve C3 in FIG. 3B. The curve C3 drops below the drop-out levels 42 for an interval $\Delta t$ between times $t0$ and $t1$ which is sufficient to allow the armature of the relay to drop out of its position representing the energized state of the relay. The interval $\Delta t$ is determined by the resistance of the discharge circuit and the value of capacitor 56.

The de-energization of the relay opens holding contacts 22–1 to terminate the flow of holding current through the winding section 22a and permit the capacitor 30 to once again charge to the output of the source of direct current voltage 26. Also, the contacts 22–2 open to de-energize the drive motor 46.

The relay 22 will also become de-energized when normally closed limit switch contacts 37–1 or normally closed safety switch 41 in the path of flow of holding current through winding section 22a open. The limit switch contacts 37–1 are momentarily opened as the garage door 1 reaches either of its limits of travel. In the case where the housing 7 moves along the rod 8 as illustrated in FIG. 1, the limit switch operating arms 9 operate a toggle switch 37 like that shown in FIG. 4 to be described.

As previously indicated, the safety switch 41 is opened when the movement of the garage door is arrested for any reason. Portions of the safety switch are rotated by movement of the slip clutch output shaft 52. When the movement of the garage door is arrested, the shaft 52 slips with respect to the output shaft 48 of the motor 46, which causes the safety switch 41 to open and thereby interrupt the flow of holding current through the winding section 22a.

MOTOR CONTROL CIRCUIT OF FIG. 4

The relay control circuit 20 of FIG. 4 is the same as that shown in FIG. 2, except that certain additional details have been added to FIG. 4, as for example, additional details of the safety switch and the limit switch. Also, the details of a modified motor control circuit controlled by the relay control circuit 20 and a circuit for controlling the energization of the lamp 6 are shown in FIG. 4.

In FIG. 4, the limit switch contacts 37–1 comprise one section of a four-section ganged toggle switch assembly. The different sections in the toggle switch assembly identified by reference numerals 37–1, 37–2, 37–3 and 37–4 switch by snap action back and forth between two switch positions as the garage door reaches its fully open and closed position. The switch sections have wipers 37–1a, 37–2a, 37–3a and 37–4a, each of which make contact with either a stationary contact No. 1 or a stationary contact No. 2. When the garage door reaches its fully closed position where the operating arm on the left side of the housing 7 contacts flange 10′, the wipers of the various sections of the toggle switch are operated to a position where they contact the associated No. 1 contact. In FIG. 4, the wiper 37–1a of the limit switch section of the toggle switch in moving between the No. 2 and No. 1 stationary contacts which are electrically connected together by a conductor 60, interrupts the flow of current through the relay winding section 22a to de-energize the relay 22. When the garage door reaches its fully open position, the arm 9 on the right side of the housing 7 is operated to switch the toggle switch into a position where the wipers thereof contact the associated No. 2 stationary contact and the limit switch again interrupts the flow of holding current in the winding section 22a to de-energize the relay 22.

The safety switch 41 illustrated in FIG. 4 has a rotatable member 41a which rotates with the slip clutch shaft 52, a wiper 41b connected to the relay contacts 22–1 and a pivoted contact arm assembly 41c carried by its rotatable member 41a which contact assembly is thrown outwardly by centrifugal force to make contact with a stationary grounded shell 41d. When the garage door movement is arrested, the shaft 52 will slip with respect to the motor shaft 48 and the contact arm assembly will separate from the stationary shell 41d to interrupt the flow of holding current through winding sections 22a.

In FIG. 4, the resistor 32 which connects the ungrounded control terminal 24 to the positive terminal 26a of the source of voltage 26 is an incandescent bulb which has a very low resistance (e.g. as 100 ohms) when a relatively small current flow therethrough which supplies standby power to the radio receiver 13, and a much higher resistance when it is heated by a large current flow therethrough when the control terminals 24–24' are short circuited.

As shown in FIG. 4, the source of direct current voltage 26 is a full wave rectifier circuit 26 which is energized from a transformer 61 having a primary winding 61a coupled to a pair of supply conductors 63–63' connected to the terminals of a source of alternating current voltage 44. The transformer 61 has a center tapped secondary winding 61b, the center tap being grounded and the outer ends of the winding being coupled through rectifiers 65—65 to the terminal 26a.

The energization circuit for the associated drive motor 46' is controlled by the toggle switch sections 37–3 and 37–4. As shown in FIG. 4, one of the terminals of the drive motor 46 is connected to the supply conductor 63 and the other terminal is connected to the No. 2 stationary contact of the toggle section 37–3 and by a conductor 62 to the No. 1 stationary contact of the toggle section 37–4. One of the field windings 46a' of the drive motor 46' has one end connected to the wiper 37–3a of the toggle switch section 37–3 and another end connected to the wiper 37–4a of the toggle switch section 37–4. A conductor 67 interconnects the No. 1 contact of the toggle switch section 37–3 and the No. 2 contact of the toggle switch section 37–4. The motor control contacts 22–2 are connected between the No. 2 contact of the toggle switch section 37–4 and the supply conductor 63'. The motor 46' has a field winding 46b' which is permanently connected between the normally ungrounded terminal of the relay control contacts 22–2 and the supply conductor 63. When the garage door is in its fully closed condition, with the engagement of the wipers of the toggle switch sections 37–3 and 37–4 with their No. 1 stationary contacts, the connections of the field winding 46a are such that the drive motor will rotate in a direction when energized to drive the garage door to a fully open condition. When the garage door reaches its fully open position, when the toggle switch wipers engage the No. 2 stationary contacts, the field winding 46a' will be connected so subsequent energization of the motor 46a' will drive the shaft in the opposite direction to move the garage door to its fully closed position.

The circuit for controlling the energization of the incandescent lamp 6 is also shown in FIG. 4. As there shown, one terminal of the lamp 6 is connected to the supply conductor 63' and the other terminal thereof is connected both to the No. 2 stationary contact of the toggle switch section 37–2 and through a jumper 67 extending between screw terminals 66–66' to a stationary contact 69. Stationary contact 69 is adapted to make engagement with a movable contact 71 of a bi-metal blade 73. In the cooled state of the bi-metal blade, the movable contact 71 is separated from the stationary contact 69. When the bi-metal blade is heated up to a given temperature, it snaps into a position where the movable contact 73 engages the stationary contact 69. The bi-metal blade 73 has a heater winding of resistance wire 75 there around, one end of the winding 75 being electrically and physically connected to the bi-metal blade 73 and the other end being connected by a conductor 77 to the motor operating contacts 22–2. The bi-metal blade 73 is connected through a jumper 79 extending between screw terminals 81–81' to the supply conductor 63. A conductor 83 extends from the jumper terminal 81 to the wiper 37–2a of the toggle switch section 37–2.

With the light conductor control circuit just described, it is apparent that when the garage door is down and the wiper 37–2a of the toggle switch section 37–2 is on the No. 1 stationary contact, the lamp 6 will de-energize. When the garage door is operated to its fully open position, the wiper 37–2a will be moved to the No. 2 stationary contact where the lamp 6 will be energized through a circuit including the toggle switch section 37–2, conductor 83 and the jumper wire 79 until the garage door is returned to its fully closed or lowered position.

When the control terminals 24–24' of the relay control circuit are short circuited to start the garage door moving to its lowered position, a heating circuit through the heater winding 75 is established through the closed contacts 22–2, the conductor 77, the heater winding 75 and the jumper 79 leading to the supply conductor 63. The heater winding 75 will heat up and cause the bi-metal blade 73 to snap into a position where the movable contact 71 makes contact with the stationary contact 69, thereby establishing an alternate energizing path for the lamp 6 extending through the jumper 67, the contacts 69 and 71, the bi-metal blade 73 and the jumper 79 connected to the supply conductor 63. When the garage door reaches its fully lowered position, the contacts 22–2 will open thereby interrupting the flow of current through the heater winding 75. After several minutes, the bi-metal blade 73 will cool sufficiently to cause the movable contact 71 to separate from the stationary contact 69, thereby de-energizing the lamp 6.

MODIFIED RELAY CONTROL CIRCUIT OF FIGS. 5 AND 6

The relay control circuit 20' of FIG. 5 represents a more flexible circuit than the circuit 20 shown in FIGS. 2 and 4. The circuits 20' and 20 have many components in common and operate in the same manner, except for the circuits controlled by the limit and safety switches 37–1' and 41' respectively. The corresponding components in the circuits 20 and 20' have been similarly numbered. In the circuit 20', it should be noted that the holding contacts 22–1 are connected directly between the left end of the winding as viewed in FIG. 5 and section 22a ground. Also, a rectifier 90 is connected between the left end of winding section 22a and the right end of winding section 22b so that the rectifier 90 conducts during the charging of the capacitor 56 when the holding contacts 22–1 are closed, and will be non-conductive to prevent the reverse charging of capacitor 56 when the contacts 22–1 are open.

A rectifier 92 is connected between the right end of winding section 22b and ground to permit discharging of the capacitor 56 and other capacitors to be described. A rectifier 94 is connected between the left plate of capacitor 56 and the ungrounded control terminal 24, so that current will flow through the control terminals 24 and 24' upon the short circuiting thereof. The rectifier 94 serves the purpose of isolating the control terminals 24 and 24' from auxiliary control circuits to be described.

The relay control circuit 20' operates in response to the short circuiting of the control terminals 24–24' in the identical manner to that described in connection with FIG. 2. As above explained, the main distinction in the circuit of FIG. 5 relates to the manner in which the safety switch 41' and the limit switch 37–1' operate in the circuit. Thus, the limit switch 37–1' is connected in an auxiliary control circuit including a series circuit comprising a capacitor 95 and a rectifier 96 connected in the order named between the left end of winding section 22b and the limit switch 37–1'. The limit switch 37–1' is a switch which is closed when the garage door is either in its fully closed or fully open position, and is open during the movement of the garage door between these extreme positions. The limit switch 37–1' is not a toggle switch as in the case of the other form of the invention. For example, it can be a single pole, double throw switch whose movable pole 37–1a' is resilient and normally urged into an open position and is pushed against one of the tied together stationary contacts 37–1b' and 37–1c' by engagement of actuating arms (like arms 9 of FIG. 1 with the flanges 10 and 10'.

The safety switch 41' operates so that it is closed when the garage door is moving at a normal speed and opens when the movement of the garage door is slowed down or arrested. To this end, the safety switch may include a rotatable shell 41a' driven by the slip clutch output shaft 52 and engaged by a wiper 41b', a contact arm assembly 41c' carried by the shell, and a grounded stationary terminal 41d' which is engaged by the contact arm assembly 41c' when the garage door movement is arrested. When the garage door is moving at a normal speed centrifugal force causes the contact arm assembly 41c' to separate from terminal 41d'.

The auxiliary control circuit associated with the safety switch 41' includes a capacitor 98 and a rectifier 101 connected in series in the order named between the left hand end winding section 22b and the safety switch wiper 41b'.

A resistance connecting screw terminal 100 is provided between rectifier 96 and the capacitor 95 and a resistance connecting screw terminal 102 is connected to the positive terminal 26a of the source of direct current voltage 26. Similar resistance connecting terminals 106 and 108 are respectively provided at the juncture of rectifier 101 and capacitor 98 and at the juncture of rectifier 94 and capacitor 56. The purpose for resistance connecting terminals 102, 106 and 108 is to provide for a selection of connections for resistor 110. In FIG. 5, resistor 110 is connected between the resistance connecting terminals 106 and 108 and a resistor 104 is connected between the resistance connecting terminals 100 and 102. With this arrangement of resistors 104 and 110, the limit switch 37–1' will de-energize the relay 22 even if the control terminals 24 and 24' are short circuited by the manual switch 11 or otherwise, and the safety switch 41' has no priority over operation of the push button switch 11, so that a closed safety switch 41', which may be due to a garage door which stops or is sluggish in its movement for any reason, can be moved by depression of the push button switch 11. (It is assumed that in the circuit of FIG. 5 the motor controlled by relay contacts 22–2 is of the type shown in FIG. 1 which includes a centrifugal switch 47 which automatically reverses the connection of the motor field windings each time the motor stops.)

When relay 22 is energized by the momentary short circuiting of the control terminals 24–24' to start motor 46, the capacitor 56 will charge up the voltage of the positive terminal 26a due to the connection of the left plate of the capacitors 56 to the positive terminal 26a through resistor 32 and the grounding of the right plate thereof through holding contacts 22–1. As the garage door moves from an extreme position, limit switch 37–1' and safety switch 41' open and capacitors 95 and 98 charge through resistors 104 and 110. If the movement of the garage door is arrested between the fully open or closed positions, capacitor 98 discharges through a path including rectifier 101, safety switch 41', rectifier 92 and the winding section 22b, thereby to generate a magnetomotive force which reduces the resultant magnetomotive force in the relay below the aforementioned holding level as above described to de-energize relay 22. Upon closure of the limit switch 37–1' as the garage door reaches a fully open or closed position, capacitor 95 will discharge through winding section 22b to de-energize relay 22 and stop the motor 46. Capacitors 56 and 98 will also discharge as the contacts of limit switch 37–1' and safety switch close as the motor 46 stops.

In FIG. 5, where resistor 110 is connected to the juncture between rectifier 94 and capacitor 56 so as to electrically couple the safety switch of the auxiliary control circuit to the control terminals 24–24', the short circuiting of the control terminals 24–24' will prevent the operation of the safety switch 41' from having an effect on the circuit. In the circuit of FIG. 6, the resistor 110 is connected directly to the resistor connecting terminal 102 associated with the positive terminal 26a of the source of direct current voltage 26 so that closure of safety switch 41' will cause discharge of the associated capacitor 98 and de-energization of the relay independently of whether the control terminals 24–24' are short circuited or open circuited.

Exemplary values of circuit parameters for the circuits of FIGS. 4 and 5 are as follows:

Resistance of winding section 22a—150 ohms
Resistance of winding section 22b—300 ohms
Resistor 29—1000 ohms
Resistor 32—100 ohms cold, 500 ohms hot
Pull-in ampere turns—100
Drop-out ampere turns—40
Resistors 104 and 110—22,000 ohms
Capacitor 30—200 microfarads
Capacitors 56, 95 and 98—25 microfarads
Output of voltage source 26—22 volts D.C.

THE MODIFIED RELAY CONTROL CIRCUIT OF FIG. 7

The relay control circuit 20'' as shown in FIG. 7 utilizes a relay 22' which has winding sections 22a' and 22b' connected together at point 111. The point 111 is connected to the conductor 27 extending to the positive terminal 26a of the source of direct current voltage 26. Current flowing between the positive terminal 26a through the winding sections 22a' and 22b' will produce magnetomotive forces acting in opposite directions. The outer or right end of the winding section 22a' is connected to one plate of a capacitor 30' whose other plate is connected to the anode of rectifier 39 whose cathode is connected to the control terminal 24. The relay 22' has holding contacts 22–1, one terminal of which is connected to ground and the other terminal of which is connected to the juncture of capacitor 30' and the rectifier 39, and through a shunt resistor 115 to the outer or right end of the winding section 22a'.

The outer or left end of the winding section 22b' is connected through a capacitor 56' to the ungrounded control terminal 24. A resistor 117 is connected in parallel with the capacitor 56. When the manual push button switch 11 or the output of a radio receiver 13' (which differs from radio receiver 13 in that the supply voltage for the radio receiver is not obtained from across the terminals 24–24') provides a momentary short circuiting of the control terminals 24–24', the capacitor 30' will charge through a circuit including the winding section 22a', rectifier 39 and the control terminals 24–24'. The capacitor 56' will also charge through a circuit including the winding section 22b' and the control terminals 24–24'. The transient charging current of the capacitors 30' and 56' will produce opposing magnetomotive forces in the winding sections 22a' and 22b'. The resistance values and the time constants of the charge circuits for capacitors 30' and 56' are adjusted to produce a resultant magnetomotive force acting in a direction determined by the current flowing in the winding section 22a', which magnetomotive force is at or above the pull-in level for the relay involved for a time interval which will energize the relay. For example, by making the capacitor 30' many times larger than capacitor 56', with charging resistances of comparable value for capacitors 56' and 30' the current in the winding section 22a' produces energization of the relay in the manner illustrated in FIG. 8A where curves C1' and C2' represent the magnetomotive forces developed by the current flow in winding sections 22a' and 22b', respectively, and curve C3 represents the resultant magnetomotive force which exceeds the pull-in level between times t1 and t2. When the relay 22' energizes holding contacts 22-1' will close to provide holding current flow through the winding section 22a' through a circuit including resistor 115 and holding contacts 22-1'. This holding current, determined by the value of resistor 115 and the resistance in winding section 22a', produces a magnetomotive force above the drop out level 42. When the short circuit is removed from the control terminals 24-24', the grounding of the anode of rectifier 39 will block the same and prevent ground potential from reaching the capacitor 56', which will quickly discharge through shunt resistor 117. Capacitor 30' remains charged to a voltage determined by the value of resistor 115.

When the control terminals 24-24' are momentarily short circuited again, a charging circuit is again established for capacitor 56' including winding section 22b' and the control terminals 24-24'. The short circuiting of the control terminals 24-24' while the holding contacts 22-1 are closed will not significantly change the voltage conditions on the capacitor 30', so substantially no current flows and the transient current flowing through winding section 22b' will produce a magnetomotive force which reduces the resultant magnetomotive force below the drop-out level of the relay for a sufficient period to allow the relay armature to return to its novel position.

FIG. 8B illustrates the manner in which the relay 22' is de-energized. Curve C2" represents the variation in the magnetomotive force due to the varying current flowing through the winding section 22b', curve C1" represents the holding magnetomotive force due to the flow of holding current through winding section 22a' and curve C3" represents the variation in the resultant magnetomotive force as a result of the currents flowing in both of the winding sections. It should be noted that the curve C3" has a magnitude below the positive and negative drop-out levels 42–42' in the interval between times t1 and t2 which interval is sufficient to permit opening of the holding contacts.

When the holding contacts 22-1 open due to de-energization of the relay and the control terminals become open circuited, the capacitors 30' will discharge through the resistor 115 and capacitor 56' will discharge through resistor 117.

An auxiliary control circuit for the relay is shown in FIG. 7 for responding to operation of the limit switch 37-1' and the safety switch 41'. As in the case of the circuit of FIG. 5, it is assumed that the limit switch 37-1' and the safety switch 41-1' will be open as the garage door moves between its extreme positions and that the limit switch 37-1' will close as the garage door reaches an extreme position. Also, the safety switch closes whenever movement of the garage door is arrested. The auxiliary control circuit includes a capacitor 120 in parallel with a resistor 122 connected between the outer or left end of the winding section 22b' and the parallel connected limit switch 37-1' and safety switch 41', so that the closure of the limit switch 37-1' or the safety switch 41' will result in the charging of capacitor 120 through winding section 22b' to de-energize the relay 22 in the manner as when the control terminals 24-24' are short circuited. The operation of the limit switch 37-1' or the safety switch 41' will de-energize the relay even when the control terminals 24-24' are short circuited.

As previously indicated, the circuit of FIG. 7 as illustrated is not designated to supply standby energizing power to the radio receiver 13' when the control terminals 24-24' are open circuited. This is due in part to the fact that the control terminal 24 is not connected to the positive voltage terminal 26a of the source of current voltage through a low resistance path which excludes the winding sections. It is therefore understood that the radio receiver 13' obtains a source of direct current voltage independently of the control terminals 24-24'. Also, due to the fact that opposing currents flow through the winding sections 22a' and 22b' when the relay 22' energizes, the relay 22' should be a sensitive relay, like a reed type relay, which has contacts of limited current capacity which are insufficient to operate the garage door motor 46. Thus, a second higher current capacity relay 122 is provided with a coil 122a connected between the positive terminal 26a and the normally ungrounded terminal of the holding contacts 21-1' of relay 22'. Thus, when the holding contacts 21-1' close, the relay 122 will become energized. The relay 122 has control contacts 122-1 which control the energization of the garage door motor 46.

Exemplary values of circuit parameters for the circuit of FIG. 7 are as follows:

Resistance of winding section 22a'—575 ohms
Resistance of winding section 22b'—325 ohms
Resistor 115—1000 ohms
Resistor 117—15,000 ohms
Pull-in ampere turns—55
Drop-out ampere turns—10
Resistors 122—100,000 ohms
Capacitor 30'—25 microfarads
Capacitors 56' and 120'—1 microfarad
Output of voltage source 26—22 volts D.C.

The circuit of FIG. 7 has many features in common with the circuits of FIGS. 2, 4, 5 and 6. For example, it operates with a relay having separate winding sections through which separate currents can flow to produce opposing magnetomotive forces. Also, separate capacitor charge circuits are provided respectively associated with the two winding sections and an isolating rectifier is provided for enabling the capacitor associated with one of the winding sections to develop a relay de-energizing current to be developed at least by the short circuiting of the control terminal 24-24'. In the circuit of FIG. 7, the current flow in winding section 22a' must overcome the opposing magnetomotive force produced by a current flowing in the winding section 22b' whereas in the circuits of FIGS. 2, 4, 5 and 6 no opposing magnetomotive force must be overcome on energization of the relay.

In all the circuits disclosed, the relay is de-energized by flow of capacitor generated current in a second winding section which opposes the magnetomotive force produced by holding current in the other winding section provided by the closure of holding contacts.

The circuits of FIGS. 5, 6 and 7 are similar in that the auxiliary control circuits containing the limit and safety switches operate to produce a relay de-energizing magnetomotive force in the second winding section which opposes the magnetomotive force produced by the holding current. In FIG. 2, the limit and safety switches operate merely to interrupt the flow of holding current. The circuits of FIGS. 5 and 6 provide for a selection of circuit operation where the safety switch can override or be overridden by the short circuiting of the control terminals.

All forms of the present invention are very extremely reliable and economical means for controlling the opening and closing of a garage door. Also, although the particular relay control circuits disclosed have particular utility in garage door control circuits, the circuits have other applications as well.

It should be understood that numerous modifications may be made in the preferred circuits disclosed without deviating from the broader aspects of the invention.

I claim:

1. In a garage door operator circuit for controlling motor means which move the garage door from one extreme position to the other each time it is energized, the operator circuit including a pair of main control terminals and associated switch means for momentarily short-circuiting the control terminals, the improvement in a relay control circuit for controlling the energizing and de-energizing of the motor means in response to operation of said switch means, said relay control circuit comprising: a relay having contact means and winding means, said relay when energized effecting movement of said contact means to a motor energizing position and when de-energized effecting movement of said contact means to a motor de-energizing position; a source of direct current voltage for supplying relay energizing current to said winding means; first circuit means interconnecting said source of voltage, relay winding means, relay contact means and control terminals for providing a first circuit for effecting current flow in said winding means which provides a relay energizing magnetomotive force when said control terminals are initially momentarily short circuited, the relay contact means including holding contacts which in the energized state of the relay completes a holding circuit providing a flow of relay energizing holding current in said winding means; and second circuit means interconnecting said source of voltage, relay winding means and control terminals for providing a second circuit which responds to the momentary short circuiting of said control terminals only while said relay contact means are in said motor energizing position by terminating said relay energizing magnetomotive force in said relay; said relay winding means comprising first and second winding sections in which respective currents can separately flow, the flow of a first current of a given magnitude and direction in said first winding section producing a relay energizing magnetomotive force which can be opposed by the magnetomotive force provided by the flow of a second current of a given magnitude and direction in said second winding section which de-energizes the relay; said first circuit means including said first winding section through which flows a current in said first mentioned direction and of at least said first mentioned magnitude when the control terminals are first momentarily short circuited; and said second circuit means including said second winding section through which flows a current in said second mentioned given direction and of a magnitude which produces said opposing magnetomotive force which de-energizes said relay when said control terminals are subsequently momentarily short circuited while said relay contact means are in said motor energizing position.

2. The garage door relay control circuit of claim 1 wherein there is provided limit switch means which, when the garage door moves into either extreme position, is operated from a first to a second condition; and means connecting said limit switch means to one of said circuits for terminating said relay energizing magnetomotive force in said relay when the condition of said limit switch means changes from said first to said second condition as the garage door moves into either of its extreme positions.

3. The garage door relay control circuit of claim 1 wherein there is provided rectifier means connected between said first circuit and said control terminals and which is conductive when said control terminals are initially momentarily closed and non-conductive after operation of said holding contacts to modify the control circuit to permit said subsequent momentary short circuiting of said terminals to effect flow of said relay de-energizing current through said second winding section.

4. The garage door relay control circuit of claim 1 wherein: said relay has a pull-in magnetomotive force level which establishes the initial energization of the relay and a lower drop-out magnetomotive force level at which the relay becomes de-energized; said first circuit includes a first capacitor which is charged and discharged respectively following the successive momentary short circuiting of said control terminals, said first capacitor establishing an initial transient current flow in said first winding section starting at the initial short circuiting of said control terminals which transient current flow provides a resultant magnetomotive force which is at or above said pull-in magnetomotive force level for a period sufficient to complete the movement of the contact means thereof to said motor energizing position, the resistance in said first circuit on operation of said holding contacts establishing a steady state current flow in said first winding section which provides a magnetomotive force level above said drop-out level; and said second circuit includes a second capacitor which is charged and discharged in the period between the start of successive momentary short circuiting intervals of said control terminals, said second capacitor establishing a transient current flow in said second winding section starting with a short circuiting of said control terminals at a time when said relay contact means are in said motor energizing position, the latter transient current flow providing a resultant magnetomotive force which is at or below said drop-out level for a sufficient period to enable the relay contact means to return to said motor de-energizing position.

5. The garage door relay control circuit of claim 4 wherein said first capacitor is connected to said source of direct current voltage to become charged to a given value when the relay contact means is in said motor de-energizing position, the initial short circuiting of said control terminals effecting discharge only of said first capacitor through said first winding section, wherein only the discharge current of said first capacitor produces a magnetomotive force during energization of the relay; the movement of said relay contacts means to a motor energizing position maintaining said first capacitor in a discharged state and providing a path for flow of holding current through said first winding section; and said second capacitor being charged upon the movement of said relay contact means to said motor energizing position, the momentary short circuiting of said control terminals while said relay contact means are in a motor energizing position discharging said second capacitor through said second winding section to produce said current flowing in said second mentioned direction and of at least said second mentioned magnitude which de-energizes the relay.

6. The garage door relay control circuit of claim 4 wherein: one of the ends of said first winding section is connected to one of the ends of said second winding section and the point of juncture thereof is connected to said source of voltage, wherein the flow of current between said source of voltage and said first and second winding sections respectively will produce opposing magnetomotive forces; said first and second capacitors charge respectively through said first and second winding sections to produce transient currents in said winding sections when said control terminals are momentarily short circuited at a time when the relay contact means are in a motor de-energizing position; said first and second circuits having impedance values which provide substantially dissimilar transient magnetomotive forces as a result of said transient, currents, whereby a resultant magnetomotive force is provided at or above said pull-in level, the resulting movement of said relay contact means to said motor energizing position maintaining said first capacitor in a substantially charged state and providing the flow of holding current through said first winding section; said second circuit is provided with means forming a discharge path for said second capacitor wherein the second capacitor becomes substantially fully discharged when the short circuiting of said control terminals is terminated, the subsequent momentary short circuiting of said control terminals effecting a recharge of the second capacitor causing current flow through said second winding section providing an opposing magnetomotive force to that produced by the holding current flowing through said first winding section which de-energizes the relay.

7. The garage door relay control circuit of claim 2 wherein said limit switch means in said first condition is in a circuit closing position and in said second condition is in a circuit opening position, said limit switch means being connected in series with said relay winding means wherein the holding current flowing therethrough passes through the limit switch means, the limit switch means being momentarily moved to said circuit opening position when the garage door reaches any one of its extreme positions to break the holding current for a sufficient period to de-energize the relay and return the relay contact means thereof to said motor de-energizing position.

8. The garage door relay control circuit of claim 1, wherein there is further provided safety switch means which has a first condition when the garage door is moving and a second condition when the garage door movement is arrested, and means connecting said safety switch means to at least one of said first and second circuit means for terminating said relay energizing magnetomotive force in said relay when the condition of said safety switch means changes from the first condition to said second condition as the movement of the garage door is arrested.

9. The garage door relay control circuit of claim 8 wherein said safety switch means is in a circuit closing position in said first condition thereof and is in a circuit opening position in said second condition thereof, and there is provided means connecting said safety switch means in series with the said relay winding means having relay holding current flowing therethrough and wherein the flow of holding current is interrupted by the safety switch means when the movement of the garage door is arrested.

10. In a garage door operator circuit for controlling motor means which moves the garage door from one extreme position to the other each time it is energized, the operator circuit also including a pair of control terminals one of which is continuously connected to a common point or ground, and control switch means for momentarily short circuiting the control terminals, the improvement in a relay control circuit for controlling the energizing and de-energizing of said motor means in response to the operation of said switch means, said relay control circuit comprising: a source of direct current voltage having a pair of output terminals one of which is grounded and between which a voltage of a given polarity appears; the relay having contact means which effect energization of said motor means when the relay is de-energized said contact means including holding contacts; said relay further including first and second winding sections in which respective currents can separately flow to produce opposing magnetomotive forces, the relay being in an energized condition when the resultant magnetomotive force produced by all the currents flowing in said winding sections is above a given pull-in level, the relay remaining energized until the magnetomotive force falls to or below a dropout level; a first rectifier; a first capacitor means; connecting the normally ungrounded control terminal in circuit with said first rectifier, said first winding section, said first capacitor, and the ungrounded terminal of the said source of direct current voltage for providing a capacitor generated transient current flow through said first winding section of the relay which provides a resultant magnetomotive force at or above said pull-in magnetomotive level when said control terminals are initially momentarily short circuited; means connecting said pair of holding contacts in circuit with said first winding section and the terminals of said source of direct current voltage for maintaining current flow in said first winding section after removal of the short circuit across said control terminals and energization of the relay which current produces a resultant magnetomotive force above said drop-out level, said first rectifier thereafter blocking to render said second capacitor effective in de-energizing the relay when the control terminals are short circuited for a second time; a second capacitor; and means interconnecting and ungrounded control terminal, second winding section and the ungrounded terminal of said source of direct current voltage for providing a capacitor generated transient current flow through said second winding section of the relay when the control terminals are short circuited for a second time which current flow produces a magnetomotive force in said second winding section which opposes the magnetomotive force generated by the flow of holding current through said first winding section for a sufficient period to enable the relay to become de-energized and the contact means thereof to return to said motor de-energizing position.

11. The garage door relay control circuit of claim 10 wherein there is provided coupling means which couples the voltage at the ungrounded terminal of said source of voltage to said normally ungrounded control terminal through a path which excludes said winding sections wherein the voltage output of said source of direct current voltage appears across said control terminals when they are open circuited, and there is connected across said control terminals the power-receiving terminals of a radio receiver for remotely controlling the relay control circuit, the receiver obtaining standby power from the voltage appearing across said control terminals while the control terminal remains open circuited, the internal resistance of the receiver appearing across said power receiving terminals being many times greater than that of said coupling means wherein relatively little power is dissipated in said coupling means.

12. The garage door relay control circuit of claim 11 wherein the charge current of the second capacitor is much greater than the standby current for said receiver, and said coupling means is a resistor which has a positive temperature coefficient wherein the resistance thereof is normally relatively small when standby current for the receiver flows therethrough and is relatively high when the charge current for said second capacitor flows therethrough.

13. The garage door relay control circuit of claim 10 wherein: said first capacitor is coupled between ground and one end of said first winding section; there is provided means coupling the ungrounded end of said first capacitor to the ungrounded terminal of said source of direct current voltage for effecting charging of said first capacitor through a circuit independent of said first winding section; said first rectifier is coupled between the other end of the first winding section and the ungrounded control terminal; said holding contacts are opened and closed when the relay is respectively de-energized and energized, the holding contacts being coupled between the end of said first rectifier remote from the ungrounded control terminal and ground; the momentary short circuiting of said control terminals discharging the first capacitor through said first winding section, first rectifier and control terminals to energize the relay, and the resulting closure of said holding relay contacts establishing a path for flow of holding current, keeping said first capacitor discharged and blocking conduction of said first rectifier; there is provided first resistor means connected between the ungrounded control terminal and the ungrounded terminal of said source of direct current voltage, means connecting said second capacitor and said second winding section in series between the end of said first resistor means remote from said terminal of said source of direct voltage and said holding contacts, whereby said second capacitor will become charged upon closure of said holding contacts after removal of the momentary short circuit across said control terminals and the subsequent momentary short circuiting of said control terminals effecting discharge of said second capacitor through said second winding section and the holding contacts and the resulting capacitor generated transient current being in a direction and of a magnitude which produces a resultant relay de-energizing magnetomotive force below said drop-out level.

14. The garage door circuit of claim 10 wherein: there is provided limit switch means which is normally in a circuit closing condition and is momentarily operated to a circuit opening condition when the garage door reaches either one of its extreme positions, and means connecting said limit switch means in the path of flow of holding current through said first winding section and holding contacts whereby the momentary operation of said limit switch means to said circuit opening condition will interrupt the flow of holding current and de-energizing the relay for a sufficient period to enable the relay contact means to return to its motor de-energizing position.

15. The garage door relay circuit of claim 13 wherein there is further provided safety switch means which is in a circuit closing condition upon movement of the garage door and is in a circuit opening condition when the garage door is arrested, and there is provided means for connecting said safety switch means in the path of flow of holding current through said first winding section and said holding contacts means, wherein the arresting of the movement of the garage door prior to its reaching an extreme position will effect de-energization of the relay and movement of the contact means thereof to a motor de-energizing position.

16. The garage door relay control circuit of claim 13 wherein: there is provided auxiliary switch means which has a pair of terminals which are open in an inoperative condition of the switch means and closed in the operative condition of the switch means, one of the said terminals being continuously grounded; a second rectifier connected between said first receiver and the ungrounded control terminal wherein the initial momentary short circuiting of said control terminals connects ground through said first and second rectifiers and said first winding section to said first capacitor to effect the discharging thereof and the subsequent short circuiting of said control terminals connects ground through said second rectifier to said second capacitor to effect the discharging thereof a third capacitor and a third rectifier connected in the order named between the point of juncture of said second capacitor and said second winding section and the other terminal of said auxiliary switch means, wherein operation of said auxiliary switch means will discharge said third capacitor through said third rectifier and said second winding section to produce an opposing relay de-energizing magnetomotive force; and second resistor means coupled between the juncture of said third rectifier and said third capacitor and the ungrounded terminal of said source of direct current voltage, to enable said third capacitor to become charged when the terminals of the auxiliary switch means and said control terminals are open circuited.

17. The garage door relay control circuit of claim 16 wherein there is provided at the juncture between said second capacitor and second rectifier and at the juncture of said third capacitor and third rectifier resistance connecting terminals permitting selective connection of said second resistor means either between said terminals or between the terminal at the juncture between said third capacitor and said third rectifier and said undergrounded terminal of said source of direct current voltage, to permit a selection of priority in the operation of the auxiliary switch means.

18. The garage door control circuit of claim 16 wherein there is provided a fourth rectifier interconnecting said first and second winding sections which fourth rectifier permits charging of said second and third capacitors when said holding contacts are closed and the control terminals are open circuited, and prevents the charging of said second and third capacitors when the holding contacts are opened and said control terminals remain open circuited, and a fifth rectifier connected between the juncture of said fourth rectifier and said second winding section for providing a discharge path for said second and third capacitors.

19. The garage door relay control circuit of claim 10 wherein: one of the ends of said first and second winding sections are connected to a common point and the common point is connected to the ungrounded terminal of said source of direct current voltage, wherein the current flowing between said underground terminal and the first and second winding sections respectively produce opposing magnetomotive forces; said first capacitor being connected between the end of said first winding section remote from said second winding section and said first rectifier, wherein the short circuiting of said control terminals will cause the first capacitor to charge through the first rectifier and winding section; said holding contacts are normally open contacts connected between the end of said first capacitor remote from said first winding section and ground; shunt resistor means coupled across said first capacitor means to provide a path for flow of holding current through said first winding section and said holding contacts when the relay is energized, said shunt resistor means being of a value to maintain said first capacitor in a substantially fully charged state when the holding contacts close; said second capacitor is connected between the end of said second winding section remote from first winding section and the ungrounded control terminal wherein the short circuiting of said control terminals will cause the second capacitor to charge through said second winding section as said first capacitor charges through said first winding section; the transient waveforms of the magnetomotive forces produced by the transient current flow in the first and second winding sections producing a resultant magnetomotive force at or above said pull-in level to energize the relay; shunt resistor means across said second capacitor permitting discharge of said second capacitor when the control terminals are open circuited, the subsequent short circuiting of the control terminals causing said second capacitor to charge once again through the second winding section to produce a magnetomotive force which opopses the magnetomotive force from the holding current flowing through the first winding section and reduces the resultant magnetomotive force to or below said drop-out level.

20. The garage door relay circuit control of claim 19 where there is further provided an auxiliary control circuit for stopping the garage door; said auxiliary control circuit being in parallel relation with the charging and discharging circuits of said second capacitor and including a third capacitor and an auxiliary switch means connected in series between the end of said second winding section remote from said first winding section and ground, said auxiliary switch means having a circuit opening condition when the garage door is moving and a circuit closing condition when the garage door movement is arrested, third shunt resistor means connected across said third capacitor means for permitting discharge of said third capacitor when the auxiliary switch means is in a circuit opening position, said third capacitor charging during movement of the garage door and discharging when the movement of the garage door is arrested through the second winding section to provide a transient current flow in the second winding section which produces a resultant magnetomotive force below said drop-out level independently of whether or not said control terminals are open circuited.

21. A toggle relay control circuit comprising a source of direct current voltage; a relay having holding contacts which have a relay energizing holding position when the relay is energized and a normal inoperative position, and first and second winding sections in which respective currents can separately flow to produce aiding or opposing magnetomotive forces, said relay having a pull-in magnetomotive force level which establishes the initial energization of the relay and a lower drop-out magnetomotive force level at or below which the relay becomes de-energized; a pair of control terminals and means for momentarily short circuiting said control terminals to operate the relay; a capacitor coupled to said first winding section, said source of direct current voltage and said control terminals for providing an initial transient current flow in said first winding section starting at the initial short circuiting of said control terminals which transient current flow provides a resultant magnetomotive force which is at or above said pull-in magnetomotive force level for a period sufficient to complete movement of the holding contacts thereof to said holding position; means connecting said holding contacts in circuit with said first winding section for establishing a steady state current flow in said first winding section which provides a magnetomotive force level above said drop-out level when the relay is initially energized; a second capacitor coupled to said second winding section, said source of direct current voltage and said control terminals for providing a transient current flow in said second winding section when said control terminals are short circuited while said holding contacts are in said holding position which transient current flow provides a magnetomotive force which opposes that produced by the flow of holding current in said first winding section, to reduce the resultant magnetoforce to a point at or below said drop-out level for a sufficient period to enable the holding contacts to be moved from said holding position.

22. The relay control circuit of claim 20 wherein said first capacitor is connected to said source of direct current voltage to become charged to a given value when the holding contacts are in said inoperative position, the initial short circuiting of said control terminals effecting discharge of said first capacitor through said first winding section, the movement of said holding contacts to said holding position maintaining said first capacitor in at least a partially discharged state and providing a path for flow of holding current through said first winding section; and said second capacitor being charged upon the movement of said relay holding contacts to said holding position when said control terminals are open circuited, the momentary short circuiting of said control terminals while said holding contacts are in said holding position discharging said second capacitor through said second winding section to produce said relay de-energizing opposing magnetomotive force.

23. The toggle relay control circuit of claim 21 wherein: one of the ends of said first winding section is coupled to one of the ends of said second winding section and the point of juncture thereof is connected to said source of voltage wherein the flow of current between said source of voltage and said first and second winding sections respectively will produce opposing magnetomotive forces; said first and second capacitors charge respectively through said first and second winding sections to produce transient currents in said winding sections when said control terminals are initially momentarily short-circuited at a time when the holding contacts are in said inoperative position; said first and second circuits have impedance values which provide substantially dissimilar transient magnetomotive force waveforms as a result of said transient currents, whereby a resultant magnetomotive force is provided at or above said pull-in level, the resulting movement of said holding contacts to said motor energizing position maintaining said first capacitor in a substantially charged state and providing flow of holding current through said first winding section; and there is provided means forming a discharge path for said second capacitor wherein the second capacitor becomes substantially fully discharged when the short circuiting of said control terminals is terminated, the subsequent short circuiting of said control terminals effecting a recharge of the second capacitor causing current flow through said second winding section which causes a magnetomotive force which passes the magnetomotive force of the holding current flowing through said first winding section to produce a resultant magnetomotive force at or below said drop-out level to de-energize the relay.

24. A toggle relay control circuit comprising a source of direct current voltage; a relay having holding contacts which have a relay energizing holding position when the relay is energized and a normal inoperative position, and first and second winding sections in which respective currents can separately flow to produce aiding or opposing magnetomotive forces, said relay having a pull-in magnetomotive force level which establishes the initial energization of the relay and a lower drop-out magnetomotive force level at or below which the relay becomes de-energized; a pair of control terminals; control switch means for momentarily short circuiting the control terminal, one of said control terminals being continuously connected to a common point or ground; a source of direct current voltage having a pair of output terminals between which a voltage of a given polarity appears, one of said terminals being grounded; a first rectifier; a first capacitor; means connecting the ungrounded control terminals in circuit with said first rectifier, first winding section, first capacitor and the ungrounded terminal of said source of direct current voltage for providing a capacitor generated transient current flow through said first winding section of the relay which provides a resultant magnetomotive force at or above said pull-in magnetomotive level when said control terminals are initially momentarily short circuited; means connecting said pair of holding contacts in circuit with said first winding section and the terminals of said source of direct current voltage for maintaining current flow in said first winding section after removal of the short circuit across said control terminals and the energization of the relay which current produces a resultant magnetomotive force above said drop-out level, said first rectifier thereafter changing its state of condition due to operation of said holding contacts to said holding position to modify the control circuit to prepare the same for a relay de-energizing operation when the control terminals are subsequently short circuited; a second capacitor; and means interconnecting the ungrounded control terminal, second capacitor, second winding section and the ungrounded terminal of said source of direct current voltage for providing a circuit which provides capacitor generated current in said second winding section when the control terminals are subsequently short circuited which current flow produces a magnetomotive force in said second winding section which opposes the magnetomotive force generated by the flow of holding current through said first winding section for a sufficient period to enable the relay to become de-energized and the holding contacts thereof to return to said inoperative position.

25. The relay control circuit of claim 24 wherein: said first capacitor is coupled between ground and one end of said first winding section; there is provided means coupling the ungrounded plate of first capacitor to the ungrounded terminal of said source of direct current voltage for effecting the charge of said first capacitor through a circuit independent of said first winding section; said first rectifier is coupled between the other end of the first winding section and the ungrounded control terminal; said holding contacts are opened and closed when the relay is respectively de-energized and energized, the holding contacts being coupled between the end of said first rectifier remote from the ungrounded control terminal and ground, the momentary short circuiting of said control terminals discharging the first capacitor through said first winding section, first rectifier and control terminals to energize the relay, the resulting closure of said holding contacts establishing a path for flow of holding current through said first winding section, keeping said first capacitor discharged, establishing a charging circuit for said second capacitor through said second winding section when the control terminals become open circuited which produces a magnetotomive force which aids energization of the relay, and blocking said first rectifier; there is provided first resistor means connected between the ungrounded control terminal and the ungrounded terminal of said source of direct current voltage; means connecting said second capacitor and said second winding section in series between the end of said first resistor means remote from said terminal of said source of direct current voltage and said holding contacts, whereby said second capacitor will become charged upon closure of said holding contacts after removal of the momentary short circuit across said control terminals, the subsequent momentary short circuiting of said control terminals effecting discharge of said second capacitor through said second winding section and the holding contacts and the flow of a capacitor generated transient current in said second winding section in a direction and of a magnitude which produces a resultant relay de-energizing magnetomotive force at or below said drop-out level.

26. The relay control circuit of claim 25 wherein: there is provided auxiliary switch means which has a pair of terminals which are open in an inoperative condition of the switch means and closed in the operative position of the switch means, one of the said terminals being continuously grounded; a second rectifier connected between said first rectifier and the ungrounded control terminal wherein the initial momentary short circuiting of said control terminals connects ground to the said first capacitor to effect the discharging thereof and the subsequent short circuiting of said control terminals connects ground through said second rectifier to said second capacitor to effect the discharging thereof; a third capacitor and a third rectifier connected in the order named between the juncture of said second capacitor and second winding section and the other terminal of said auxiliary switch means, wherein operation of said auxiliary switch means will discharge said third capacitor through said third rectifier and said second winding section to produce an opposing relay de-energizing magnetomotive force; and second resistor means coupled between the juncture of said third rectifier and said third capacitor and the ungrounded terminal of said source of direct current voltage, enabling said third capacitor to become charged when the terminals of the auxiliary switch means and said control terminals are open circuited.

27. The relay control circuit of claim 26 wherein there is provided at the juncture between said second capacitor and second rectifier and at the juncture of said third capacitor and third rectifier resistance connecting terminals permitting selective connection of said second resistor means either between said terminals or between the terminal at the juncture between said third capacitor and said third rectifier and said ungrounded terminal of said source of direct current voltage, to permit a selection of priority in the operation of the auxiliary switch means.

28. The relay control circuit of claim 26 wherein: there is provided a fourth rectifier interconnecting said first and second winding sections, which fourth rectifier permits charging of said second and third capacitors when said control terminals are open circuited and prevents the charging of said second and third capacitors when the holding contacts are open and said control terminals remain open circuited; and a fifth rectifier connected between the juncture of said fourth rectifier and said second winding section for providing a discharge path for said second and third capacitors, said second resistance means enabling said third capacitor to become charged when said control terminals are open circuited and said auxiliary switch means is open.

References Cited

UNITED STATES PATENTS 2,887,311   5/1959   Klamp ------------ 318—266

ORIS L. RADER, *Primary Examiner.*

K. L. CROSSON, *Assistant Examiner.*

U.S. Cl. X.R.

317—151, 155.5; 318—300